Nov. 27, 1962    P. E. WILLIAMS    3,065,933
HELICOPTER

Filed May 20, 1960    4 Sheets-Sheet 1

Paul E. Willams
INVENTOR.

BY *Clarence A. O'Brien*
*and Harvey B. Jackson*
Attorneys

Nov. 27, 1962 P. E. WILLIAMS 3,065,933
HELICOPTER
Filed May 20, 1960 4 Sheets-Sheet 2

Paul E. Williams
INVENTOR.

Nov. 27, 1962

P. E. WILLIAMS 3,065,933

HELICOPTER

Filed May 20, 1960

Paul E. Williams
INVENTOR.

BY

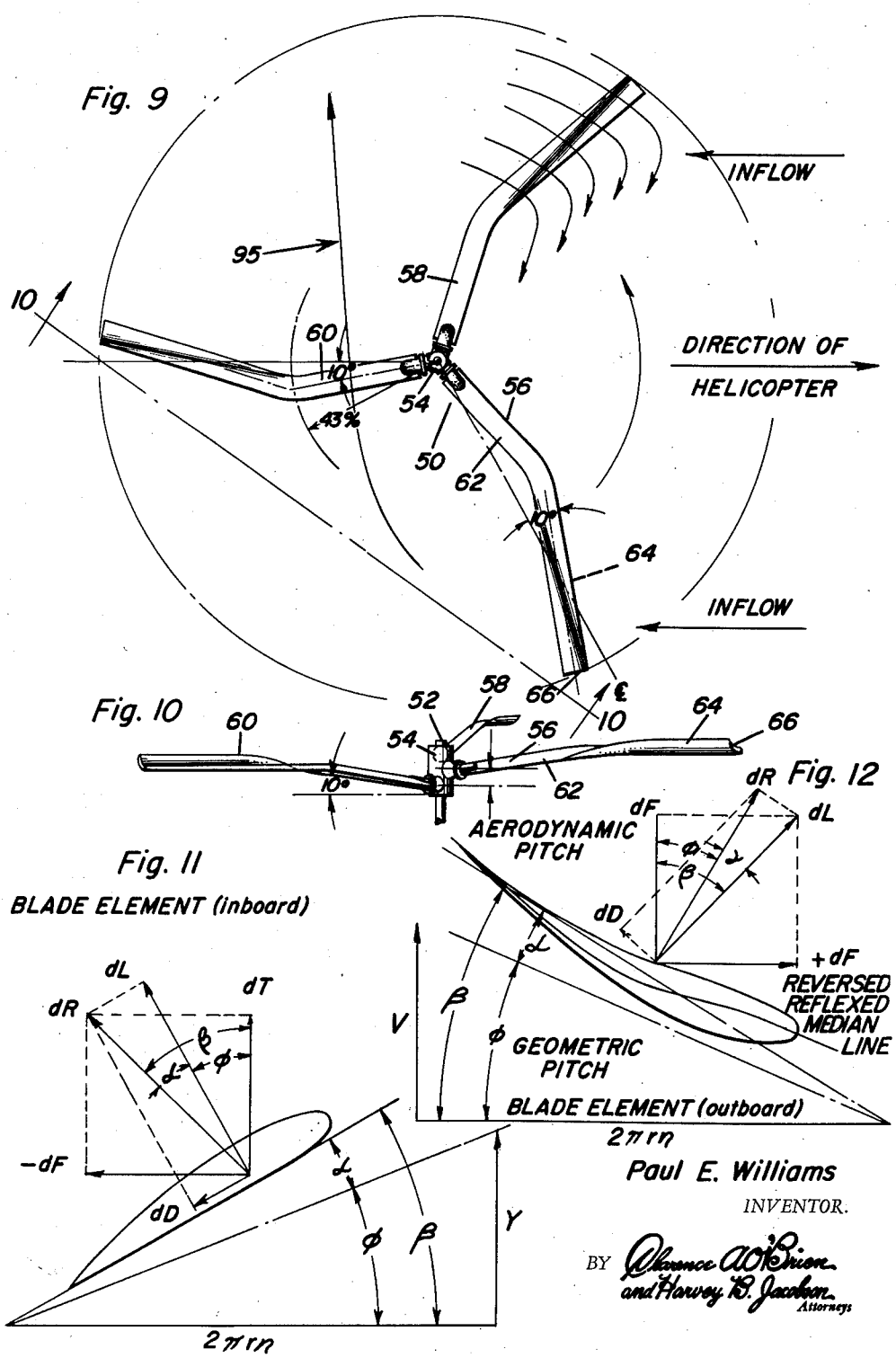

United States Patent Office 3,065,933
Patented Nov. 27, 1962

3,065,933
HELICOPTER
Paul E. Williams, Washington, D.C., assignor to
A. Frank Krause, Jr., Annandale, Va.
Filed May 20, 1960, Ser. No. 31,251
13 Claims. (Cl. 244—17.11)

The present invention generally relates to helicopters and more particularly to improvements in a helicopter rotor incorporating various novel features which favorably effect the entire operation of the helicopter and this application is a continuation-in-part of co-pending application Serial No. 23,969, filed April 22, 1960, now abandoned, for Helicopter.

The ordinary helicopter rotor which undergoes cyclic pitch changes has a number of inherent disadvantages which are simply tolerated at the present time or which are counteracted—as opposed to corrected.

For instance, in a conventional helicopter rotor blade, the center of pressure shifts approximately 25% during the normal sweep of the azimuth. This aerodynamic shift excites the adjacent air and causes vibrations which are, of course, energy parasitic. The mechanical mass of the blade is added to the excitations of the air and the vibrations produced will have harmonics transmitted throughout the entire helicopter structure. A very obvious sensual manifestation of this can be felt and heard since considerable energy is lost in the production of sound. Helicopter rotor operations are notoriously noisy.

One of the principal objectives of the invention is to provide a helicopter rotor which operates very smooth, eliminating practically all, if not all, of energy losses due to the aerodynamic shift, noise and air excitation discussed above. A very important object of the invention is to provide a helicopter rotor which requires no anti-torque compensation device or at least eliminates torque to the extent that auxiliary motor means for counteracting torque is unnecessary and which entails only a single rotor as opposed to counter-rotating rotors, and which is completely functional as a thrust producing and sustaining rotor.

Accordingly, all of the cyclic pitch control mechanism is eliminated thereby saving weight, cost, mechanical complication and avoiding a possible source of mechanical difficulty.

Briefly, a rotor in accordance with the invention obtains all of the benefits, as far as can be determined, of a cyclically operated rotor, but without the corollary disadvantages of a cyclic actuation. This is achieved largely by the configuration of the blades of the rotor and by the discovery that the effect of cyclic pitch changes may be accomplished aerodynamically. Actual tests have shown this to be accurate and true.

Another feature of the present invention is the construction of the rotor having a dihedral angle in each blade, arranging the blades in vertically spaced relation so that each blade travels in a separate horizontal plane and angulating the outer portion or tip of each blade away from the direction of rotation.

Another important object of the invention is to provide a helicopter rotor blade which has very little if any tip turbulence, thereby increasing the efficiency of the blade, reducing the power necessary to rotate it, and thereby reducing the torque created by the engine in driving the blade.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 9 is a schematic top plan view of the rotor illustrating the angular arrangement of the outer portions of each blade.

FIGURE 10 is a side elevational view of the schematic rotor illustrating the dihedral angle in each blade and illustrating the vertical gradient of the blade centerlines.

FIGURE 11 is a graph illustrating the forces of the inboard portion of the blade element.

FIGURE 12 is a graph illustrating the forces of the outboard blade element for eliminating torque.

Figure 1:
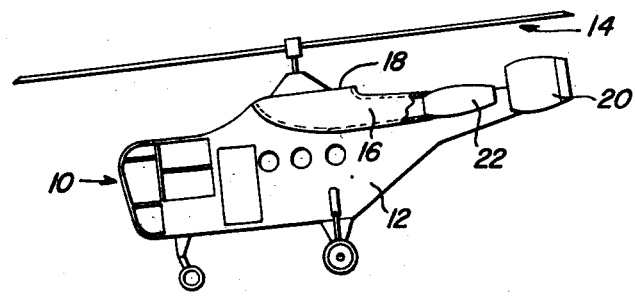
FIGURE 1 is a side elevational view of a helicopter equipped with a rotor in accordance with the invention and further showing an optional ducting system to take advantage of some of the flow obtained by increased downwash from the trailing edge of each of the rotor blades.

Helicopter 10 (FIGURE 1) has a fuselage 12 of any configuration and is provided with a rotor 14 constructed in accordance with the principles of the invention. Considering first two optional features, there is a duct 16 attached to the fuselage and having an inlet scoop 18 concentric with rotor 14 and below it. The purpose is to receive downwash from the rotor and conduct the downwash air under pressure through longitudinal duct 16 to immerse an aerodynamic control surface device 20 e.g. a vertical and adjustable fin, in this flow. The aerodynamic control surface device 20 provides lateral control for the helicopter about its yaw axis, and conventional means for adjusting the position of the control surface device 20 may be used. The air ejecting from duct 16 also reacts on surface 20 so as to create a forward thrust for the helicopter. Engine 22 is located in or behind duct 16 in order to further take advantage of the downwash air or more precisely, a percentage thereof. Engine 22 may be a ram jet or any other type of jet engine and may be used to provide additional thrust for the helicopter and its exhaust may be directed over the control surface 20 for additional directional control. By forcing air from rotor 14 into the intake of engine 22 by duct 16, the engine is effectively supercharged. Standby thrust or continual thrust is available by using engine 22, although it is to be clearly understood that the engine is an optional feature following the principles of the invention. Furthermore, when an engine 22 is used, it is possible to eliminate aerodynamic control surface 20 in favor of an exhaust deflector at the discharge end of the engine 22, such deflectors having been successfully used as early as 1933 in the Camproni jet engine airplane. To my knowledge, however, the conception of ducting a portion of the rotor downwash of a helicopter either with or without an engine is a unique way of obtaining control forces applied as moments on the helicopter.

Figure 5:
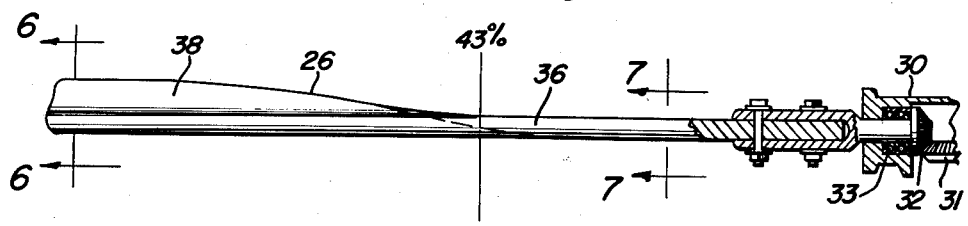
FIGURE 5 is a front elevational view showing one of the blades and a part of the hub of the rotor.

Typical rotor 14 has three blades 24, 26 and 28 (FIGURE 2) although the number may be increased or decreased. Each blade is identical and therefore discussion of a single blade necessarily leads to an understanding of all the blades. The hub 30 supports the blades in such a manner that they may be adjusted for pitch change in the same manner as a conventional aircraft propeller hub functions. However, the pitch change is not a cyclic pitch change. Instead, hub 30 has a pitch adjusting gear 31 engaged with gears 32 at the inner ends of each blade (FIGURE 5) with a spring compressor 33 behind the gear. By turning gear 31 all blades of the hub are adjusted as to pitch for feathering the blades, for ground movements or for any purpose other than obtaining a cyclic pitch change during the functioning of a rotor. Obviously, cyclic pitch change producing mechanisms are completely different from what is shown in FIGURE 5.

Typical blade 26 is shown in detail in FIGURES 4–7. The blade has an inboard section 36 and an outboard section 38. Since actual testing was carried on with a blade whose outboard section 38 extended from the tip 40 to the 43% station, for the purpose of description of one particular blade configuration, the 43% station shall be considered the separation plane between the outboard section 38 and the inboard section 36. The inboard section has a conventional airfoil shape as shown by the cross section in FIGURE 7. For instance, a suitable selection of NACA shape was made. The outboard section 38 is of special configuration and is responsible to a very large extent for the elimination of cyclic pitch devices and anti-torque devices in a helicopter which uses a single rotor. What is thought to be a particularly important discovery is that cyclic pitch control devices and anti-torque devices are not only eliminated, but greater mechanical and aerodynamic efficiency have been achieved by this helicopter.

Figure 4:
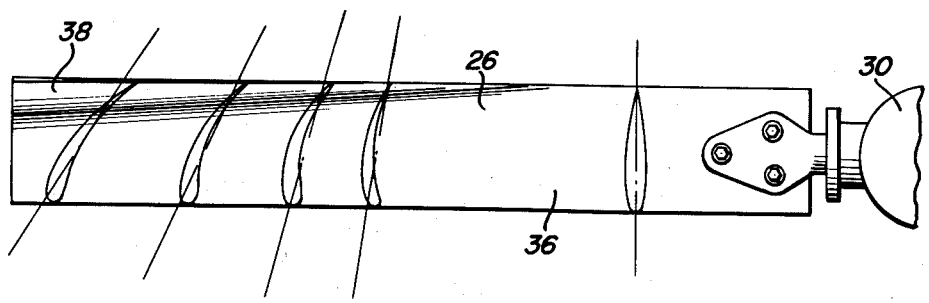
FIGURE 4 is a diagrammatic top plan view showing various sections of the blade as they would appear at the stations along the radius of the blade.
Figure 6:
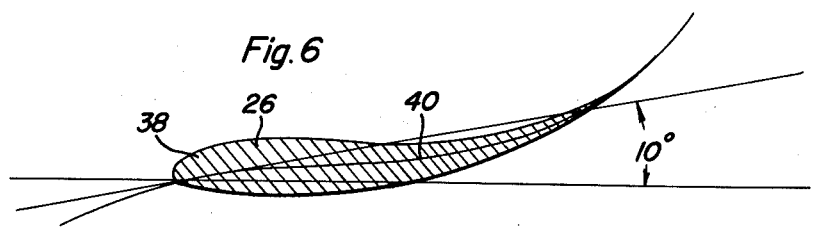
FIGURE 6 is a true section of the blade taken at the tip station thereof.
Figure 7:
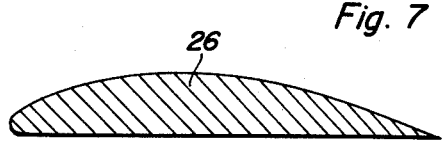
FIGURE 7 is a true section of the blade inboard of the 43% station of the blade, for instance along the line 7—7 of FIGURE 5.

Section 38 of blade 26 has a reflexed and reversed median line as shown at 40 (FIGURE 6). As indicated in FIGURE 4, the median line, and consequently the sections at each station, increases in curvature from the postulated 43% station to the tip. This shape is not only shown by the sections but also by the shading in FIGURE 4 and by comparison of FIGURES 4 and 5. As stated earlier in this description, FIGURE 6 discloses the true shape of the outboard section 38 at the tip thereof.

Figure 2:
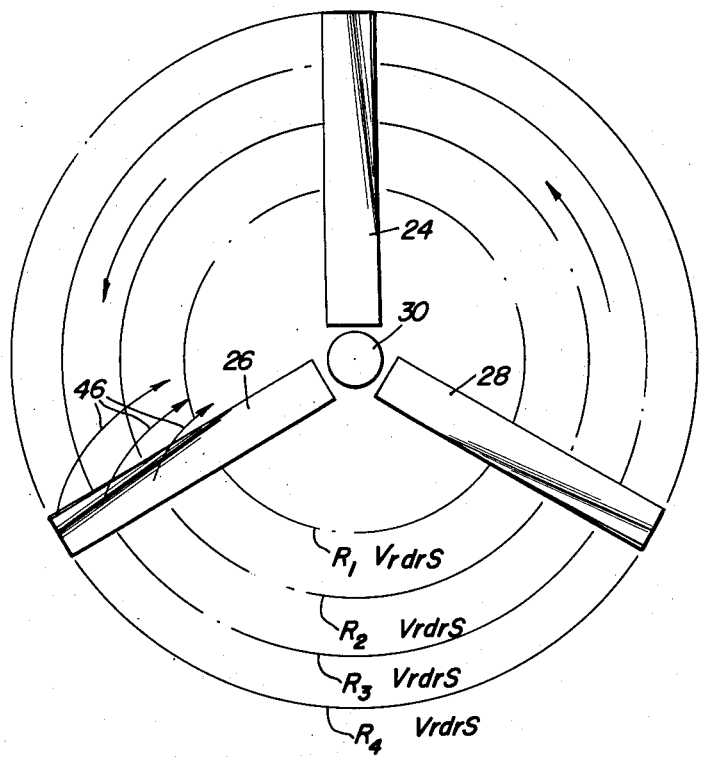
FIGURE 2 is a top view schematically showing the rotor and some of the flow conditions.
Figure 3:
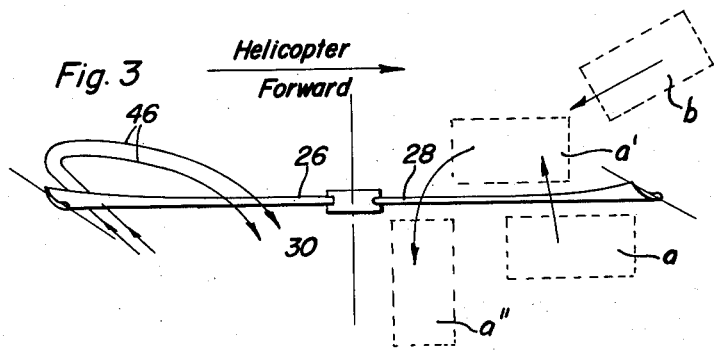
FIGURE 3 is a side elevational view of the schematic rotor showing further some of the flow conditions.

Actual ordinate values which are perfectly applicable herein, are found in co-pending application Serial No. 9,374, filed February 17, 1960, and considerable flow theory, supported empirically, mathematically and by actual tests and highly successful flight in full scale airplanes, is found in co-pending application Serial No. 805,171, filed April 9, 1959, now Patent No. 3,009,670. The flow field theory discussed in the earlier application is partially discussed below, especially with reference to FIGURE 2 showing four expansion waves identified at four different blade stations. These expansion waves are vibrations in the air caused by vibrations of the blades 24, 26 and 28, turbulent airflow in the vicinity of the blades, the shock of air striking the blades, and other factors. These waves include sound waves, waves of different frequencies than the sound waves and even shock waves when the blades surpass the speed of sound. The waves all travel radially outwardly from the rotating blades in the same manner as waves expand radially outwardly on the surface of water from a wave generating point. Curves 46 show how the expansion waves are curved inboard just as in the case of the expansion waves in the field around an airplane, as illustrated and described in the earlier filed reference application. A projection of curves 46 is shown in FIGURE 3 (left side).

An important point discussed in the earlier filed application No. 805,171 is that the shape (wing in the earlier filed application and blade in this application) is capable of flying with an infinite aspect ratio effect where the wing or blade has a definite geometric aspect ratio. The mathematical aspect ratio is actually infinite, however, since "aspect ratio" is often considered only from its geometrical definition, suffice to indicate that the blade provides an infinite aspect ratio "effect." It is well known that a wing or airfoil section having an infinite aspect ratio is much more efficient than conventional wings since it precludes all tip turbulence. In conventional wings, tip turbulence is produced because of the vacuum on the upper surfaces of the wing and the increased pressure at the lower surface of the wing caused by the positive incidence thereof. The increased pressure at the lower surface of the wing normally flows around the tip of the wing towards the reduced pressure area at the upper surface thereof. This obviously reduces the lifting capacity of the wing, and furthermore substantially increases the drag thereof. In the past, various attempts have been made to overcome this tip turbulence, such as installing vertical plates at the ends of the wings. However, this has been found to be impractical because of the increased expense, drag, and weight. However, I have found that by providing negative angular incidence at the extreme outer tip portion of a wing, propeller, or other airfoil section, that tip turbulence is easily prevented. This is apparently caused by the fact that the negative angular incidence at the airfoil tip destroys the vacuum at the upper surface thereof and the above atmospheric pressure at the lower surface thereof. Since the pressures on the upper and lower surfaces of the airfoil are equalized, there is no tendency for the air to flow around the tip thereof. By destroying this tip flow or turbulence, an ideal condition is created which is known as "infinite aspect ratio effect." Possibly, the only difference in applying the basic theory discussed in the earlier application to the helicopter blade is that the instantaneous center of pressure is ahead of the airplane at subsonic speeds and somewhat behind the nose of the airplane at supersonic speeds; whereas the instantaneous center of pressure for a helicopter is at the center of the plane of rotation of the rotor blades. The expansion waves (FIGURE 2) are concentric with the axis of rotation of the blades; in the airplane flow field, the airplane is slightly ahead of the expansion wave at subsonic speeds and is partly ahead of the compression wave at supersonic speeds. In the case of the airplane the compression wave is constantly following the airplane in forward flight. This wave crosses the wing at a point of the intersection of the 43% station, for one particular wing, and the leading edge of the wing. In the helicopter, this wave is also ahead and under the rotor producing a small outboard radial flow.

Returning again to FIGURES 2 and 3, an explanation of how the cyclic pitch is eliminated will be discussed. Curves 46 have been described as illustrating the expansion waves are curved inboard just as in the case of the expansion waves in the field around an airplane as disclosed in the earlier application. When the up travel of the flow across the reflexed tip sections of the outboard blade section changes from kinetic to potential the flow is free to change direction as a new inductance of flow induced by the downwash of the rotor at the center 43% of the rotor. This new volume is added to the center i.e. the inboard section of the rotor blade area and increases the magnitude of the downwash force for increased lift. This effect is illustrated by the sources and sink of FIGURE 3. Lower source A travels up to position $a'$ and then in and down to position $a''$ being the region of the sink. The inflow $b$ occurs as the helicopter travels forward. This inflow is distributed over the disk area of the plane of rotation of the rotor causing a uniform distribution of air through the blades. This condition nullifies the upstream-downstream effect thereby eliminating the need for cyclic pitch changing as now found in ordinary helicopter operation. The azimuth of the rotor blades is not effected by the upstream-downstream effects of the existing helicopters. This means that the cyclic pitch mechanism may be eliminated as being an unnecessary appendage. It has further been found that there is a very large reduction in torque of the rotor system if not the complete elimination thereof, such that anti-torque rotors may be completely eliminated and only some of the downwash air tapped for longitudinal stability and directional control.

Figure 8:
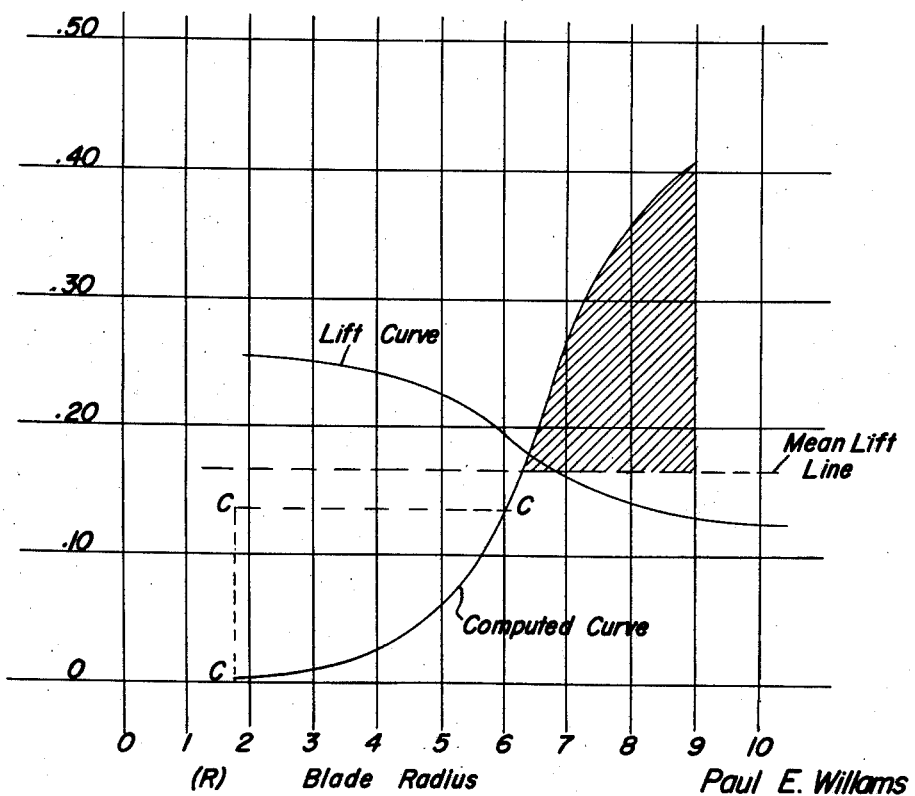
FIGURE 8 is a graph showing principally the lift curve of one of the blades.

FIGURE 8 discloses very important facts. The lift curve, computed curve and mean lift line are shown. The shaded area must be considered folded to the position *ccc* because of the flow direction indicated in FIGURE 2 by the arrows, i.e. the mass of air handled by the outboard part of each blade is moved inward toward the root sections of the blades and contributes to the downwash. Contributing to the downwash, of course, lift is augmented. Both experimental data and theory indicate a lift coefficient of 3.00 whereas the ordinary helicopter has a lift coefficient of less than 1.00 and usually not more than .524.

Actual wind tunnel and whirl tests indicate that a drag coefficient range from $C_d=0.0115$ @ $C_1=0.71$ and $(L/D)=27.99$ to $C_d=0.0280$ @ $C_1=3.00$ and $(L/D)=19.80$ prevails when applying these principles to my helicopter rotors ($C_d$=drag coefficient, and $C_1$=left coefficient). From this standpoint, the horsepower requirements will be reduced, varying directly as the ratio of the drag coefficients of this invention to the drag coefficients of a standard helicopter rotor. The power required for my helicopter ranges from 38% to 93% of the power required for a standard helicopter as the $C_1$ rises from .71 to 3.00.

By providing a negative angle of incident at the tip portion of each rotor blade, tip turbulence is eliminated so that the tip noise is greatly reduced, especially when compared with the conventional helicopter blade. The expansion waves in the present helicopters, continue outward permitting the downflow to be a truncated cone, causing the rotor disk to be greatly dependent on ground effects for flight stability. This same condition obviously does not exist with the helicopter in accordance with the invention.

FIGURES 9–12 illustrate a modified and improved version of the rotor illustrated in FIGURES 1–8 and accomplishes everything that is accomplished by the device shown in FIGURES 1–8 and it includes certain additional features. The rotor is generally designated by numeral 50 and is mounted on a vertical shaft 52 by virtue of a hub 54. The propeller 50 includes three blades 56, 58 and 60 each of which is of identical construction and only one blade will be discussed in detail. The blades 56, 58 and 60 are mounted on the hub 54 in the same manner as the blades 24, 26 and 28 are mounted in FIGURES 1–8. However, the blades are mounted with their center lines disposed in vertically spaced planes on the hub 54. The blades actually rotate in vertically spaced horizontal planes (when the rotor axis is vertical).

Each blade is provided with an inboard section 62 and an outboard section 64 with the outboard section 64 extending from the tip 66 inwardly to the 43% station which may be considered the separation plane between the outboard section 64 and the inboard section 62. The inboard section 62 has a conventional airfoil shape but the outboard section 64 has a special profile, the same as the blade described in connection with FIGURES 1–8.

As illustrated in FIGURE 10, the inboard section 62 of each of the blades is provided with a 10° dihedral angle while the outboard section 64 is level. The outboard section is swept back in relation to the inboard section of the blade. Using the centerline as a reference line, the inboard section is swept forward 10° while the outboard section is swept back 10° from the 43% station at the juncture of the sections.

The vertical gradient of the blade centerlines of the hub results in the elimination of the interplane effect. Considering FIGURES 9 and 10 as drawn, blade 60 is the lowest and blade 58 is the highest. Due to the vertical spacing of the blades, blade 58 operates in the wake of blade 56, blade 56 operates in the wake of blade 60 and blade 60 operates in the atmospheric reservoir. The upwash, as it passes a blade functions the same as described in connection with FIGURE 3, but there is now the advantage of a time lag (due to the sweep forward and swept back of sections), allowing the outboard air to organize and be induced down in the region of the inboard sections. The upstream-downstream condition is eliminated by allowing some of the air to spill across the disc (shown by line 95) to equalize the flow volume across the entire disc. In terms of volume and velocity, the outboard sections handle a volume greater than the acceptance capacity of the sink at the inboard sections. Some air (95) then spills in the outboard circle of the retreating blade. The sweep back furnishes the necessary time lag. Also the vertically spaced orientation of the blade increases the depth of air effected. This increase in the depth of air actually requires the air to travel a greater distance to the center of the rotor thereby increasing the time required for the inflow to reach the inner or center portion of the rotor defined by the inner 43% of the blades. The delay or extended time required for the inflow to reach the center portion of the rotor is caused by the actual increase in distance which this inflow must travel and therefore permits a rearrangement of the regimen of the inflow for increasing the volume of downwash. Flow over the inboard section which is down and the flow over the outboard section which is upwards completely balances the torque forces acting on the wing or blade, as the case may be. Then as the tip rotor section takes lift from the upflow of air inclining the lift vector forward as shown at $dL$ in FIGURE 12, the resolution of this force into its components around the "X" and "Y" axis shows that there is a component of force $dF$ in the opposite direction to the drag force. Comparing FIGURES 11 and 12, it can be seen that the drag forces $+dF$ and $-dF$ are substantially equal and opposite, thereby cancelling each other. In the Drzwiecki blade element theory the drag forces on the blades causes the propeller torque force so that for standard helicopters the application of the Drzwiecki theory accounts for the torque in the helicopter rotors. Therefore, in the proposed helicopter rotor blades the resolution of the lift force into a force component in the direction of the rotor blade rotation direction indicates that the drag force is neutralized thereby minimizing the force responsible for the torque in rotor blades. In other words, since there is in effect no drag on the blades, there is no torque tending to turn or rotate the body of the helicopter.

Referring now more particularly to FIGURES 11 and 12, the former discloses an inboard blade element section and typical forces associated therewith. FIGURE 12 discloses the same thing, but for an outboard section. The outboard section, in operation, has a negative angle of attack while the inboard section has a positive angle of attack. The force diagrams in each of these figures have conventional symbols applied thereto and the vectors are resolved in the usual way. $dF$ in FIGURE 12 resolves itself into the torque component in both the outboard and inboard sections, but it is specifically pointed out that the signs are opposite, meaning that these drag forces in the inboard and outboard blade sections will cancel each other. Since these forces represent torque, the torque which is attributable to the aerodynamic reaction is eliminated. The distinction is made between the power input torque reaction of the engine and rotor shaft, with aerodynamic torque.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a helicopter, a rotor having blades whose operation is accompanied by low torque for the elimination of antitorque devices and whose aerodynamic behaviour is responsible for the elimination of cyclic pitch changes, said rotor having blades each with inner sections and outer sections, each blade being similar and the inner section of each blade being of indifferent conventional airfoil cross section, the outer section of each blade being twisted along its longitudinal axis with the outermost sections having a smaller angle of incidence than the sections closer to the center of rotation of the rotor so that upon rotation of the rotor blades any expansion waves in the air adjacent the blades are curved inward toward the axis of rotation of the rotor and downward to contribute to the downwash, the inflow at the rotor disk occurring as the helicopter travels forward being distributed over the disk area of the plane of rotation causing a uniform distribution of air through the blades with said inflow being inducted as downwash at the inboard sections of said blades and this condition nullifying the upstream-downstream effect of a cyclically operating helicopter rotor.

2. In a helicopter having a fuselage, a rotor including a plurality of blades, each blade having an inner end, a tip, a hub with which said inner ends are connected, the outboard blade section of each being twisted to create a varying angle of attack and to produce an upflow so that the lift vector is normal to the flow resolved into components directed to counter-act torque of the rotor, the flow over said sections being kinetic and after leaving the trailing edge becoming and being potential flow and as such subject to moving in the direction of the nearest adjacent kinetic flow which is the downwash at the inboard sections of the blade, said blades being connected to the hub with their centerlines vertically spaced in relation to each other whereby the blades travel in separate vertically spaced planes thereby eliminating interplane effect, the upper blades of the rotor travelling in the upwash wake of the preceding lower blades thereby more effectively inducing inflow.

3. In a helicopter having a fuselage, a rotor including a plurality of blades, each blade having an inner end, a tip, a hub with which said inner ends are connected, the blade sections from approximately the 43% station to said tip being twisted along a longitudinal line so that the radially outer ends of the blades have a negative angle of attack which produces an upflow following said median line so that the lift vector is normal to the flow resolved into components directed to counteract torque of the rotor, the flow over said sections being kinetic and after leaving the trailing edge becoming and being potential flow and as such subject to moving in the direction of the nearest adjacent kinetic flow which is the downwash at the inboard sections of the blade, the outer portion of the blades disposed outwardly of the 43% station being swept back thereby providing a time lag in the upwash thereby allowing the outboard air to organize and be induced down in the region of the inner portions of the blades.

4. A helicopter having a fuselage, a rotor including at least one blade rotatably mounted on the fuselage for lifting same, each blade having a radially inner portion and a radially outer portion, the inner portion having a positive angle of attack and at least the outer end of the outer portion having a negative angle of attack whereby the torque produced by the rotor is greatly reduced.

5. A device as defined in claim 4 wherein the angle of attack of the outer portion gradually decreases in a radially outward direction.

6. A helicopter having a fuselage, a rotor including at least one blade rotatably mounted on the fuselage for lifting same, each blade having a radially inner portion and a radially outer portion, the inner portion having a positive angle of attack and at least the outer end of the outer portion having a negative angle of attack whereby the torque produced by the rotor is greatly reduced, the cross-sectional shape of the outer portion comprising an inverted airfoil.

7. A helicopter having a fuselage, a rotor including at least one blade rotatably mounted on the fuselage for lifting same, each blade having a radially inner portion and a radially outer portion, the inner portion having a positive angle of attack and at least the outer end of the outer portion having a negative angle of attack whereby the torque produced by the rotor is greatly reduced, said outer portion extending from the 43% station to the tip of the blade.

8. A helicopter having a fuselage, a rotor including at least one blade rotatably mounted on the fuselage for lifting same, each blade having a radially inner portion and a radially outer portion, the inner portion having a positive angle of attack and at least the outer end of the outer portion having a negative angle of attack whereby the torque produced by the rotor is greatly reduced, the cross-sectional shape of the outer portion comprising an inverted airfoil, said outer portion extending from the 43% station to the tip of the blade.

9. A helicopter having a fuselage, a rotor including at least one blade rotatably mounted on the fuselage for lifting same, each blade having a radially inner portion and a radially outer portion, the inner portion having a positive angle of attack and at least the outer end of the outer portion having a negative angle of attack whereby the torque produced by the rotor is greatly reduced, the cross-sectional shape of the outer portion comprising an inverted airfoil, having a concave upper surface and a convex lower surface.

10. A device as defined in claim 4 wherein said inner portion is swept forwardly and said outer portion is swept rearwardly in relation to the direction of rotation of the rotor and in relation to a radial line joining the root and tip of the blade.

11. A device as defined in claim 4 wherein a plurality of blades are provided on the rotor, each blade being vertically spaced from every other blade.

12. A device as defined in claim 4 wherein at least the inner portion of the blade is inclined upwardly with respect to its axis of rotation so as to provide a positive dihedral therefor.

13. A device as defined in claim 4 wherein the rotor comprises a plurality of blades carried by a central hub, each blade being rotatable about its longitudinal axis with respect to the rotor, and means on the hub for simultaneously rotating each blade about its longitudinal axis.

References Cited in the file of this patent

UNITED STATES PATENTS

| | | |
|---|---|---|
| 1,506,937 | Miller | Sept. 2, 1924 |
| 2,433,251 | Whiting | Dec. 23, 1947 |
| 2,518,697 | Lee | Aug. 15, 1950 |

FOREIGN PATENTS

| | | |
|---|---|---|
| 577,524 | Great Britain | May 21, 1946 |